(12) United States Patent
Anfang et al.

(10) Patent No.: US 8,679,584 B2
(45) Date of Patent: Mar. 25, 2014

(54) METHOD FOR PARTIALLY COATING COMPLEX COMPONENTS WITH CATALYTICALLY ACTIVE COMPONENTS

(75) Inventors: Hans-Georg Anfang, Feldkirchen-Westerham (DE); Thomas Speyer, Schliersee (DE)

(73) Assignee: Clariant Produkte (Deutschland) GmbH, Frankfurt am Main (DE)

( * ) Notice: Subject to any disclaimer, the term of this patent is extended or adjusted under 35 U.S.C. 154(b) by 616 days.

(21) Appl. No.: 12/678,842

(22) PCT Filed: Sep. 18, 2008

(86) PCT No.: PCT/EP2008/007823
§ 371 (c)(1),
(2), (4) Date: Feb. 8, 2011

(87) PCT Pub. No.: WO2009/036977
PCT Pub. Date: Mar. 26, 2009

(65) Prior Publication Data
US 2011/0123715 A1     May 26, 2011

(30) Foreign Application Priority Data
Sep. 19, 2007 (DE) .......................... 10 2007 044 585

(51) Int. Cl.
*C23C 24/08* (2006.01)

(52) U.S. Cl.
USPC ........... 427/243; 427/247; 427/259; 427/270; 427/226; 427/380; 427/388.1; 427/385.5; 502/429

(58) Field of Classification Search
USPC ......... 427/228, 243, 244, 247, 272, 282, 259, 427/226, 380, 388.1, 385.5; 502/439
See application file for complete search history.

(56) References Cited

U.S. PATENT DOCUMENTS

| 4,900,712 | A | | 2/1990 | Bar-Ilan et al. |
| 5,328,723 | A | | 7/1994 | Horki et al. |
| 5,686,039 | A | * | 11/1997 | Merry ............................ 264/259 |
| 6,071,850 | A | * | 6/2000 | Friedman et al. ............. 502/439 |
| 7,132,150 | B2 | * | 11/2006 | Ogunwumi et al. .......... 428/117 |
| 7,252,749 | B2 | * | 8/2007 | Zhou et al. .................... 204/484 |
| 7,601,671 | B2 | * | 10/2009 | LaBarge ....................... 502/326 |
| 2004/0191488 | A1 | | 9/2004 | Berndt et al. |

(Continued)

FOREIGN PATENT DOCUMENTS

| DE | 29 40 582 A1 | 4/1981 |
| DE | 43 34 131 A1 | 4/1995 |

(Continued)

OTHER PUBLICATIONS

Clear image of Fig. 8 of US 7252749. (Aug. 2007).*

(Continued)

*Primary Examiner* — Michael Cleveland
*Assistant Examiner* — Alex A Rolland
(74) *Attorney, Agent, or Firm* — RatnerPrestia

(57) ABSTRACT

A method for partially coating a shaped body, the surface of which comprises an area to be coated and an area to be left clear, wherein with the method a protective layer is applied to the area to be left clear, a layer comprising a fluid phase is applied to the surface, and the coated shaped body is heated to a temperature at which the protective layer is removed residue-free by pyrolysis.

32 Claims, 1 Drawing Sheet

(56) References Cited

U.S. PATENT DOCUMENTS

| | | |
|---|---|---|
| 2005/0191480 A1 | 9/2005 | Tao et al. |
| 2006/0112677 A1* | 6/2006 | Sabelstrom .................... 60/273 |
| 2006/0204661 A1 | 9/2006 | Beck et al. |
| 2008/0053333 A1* | 3/2008 | Johnson et al. ............ 106/31.05 |
| 2009/0250379 A1 | 10/2009 | Kurtz et al. |

FOREIGN PATENT DOCUMENTS

| | | |
|---|---|---|
| DE | 101 49 892 A1 | 4/2003 |
| DE | 10 2004 058 705 B3 | 8/2006 |
| EP | 1 510 592 A1 | 3/2005 |
| EP | 1 829 608 A1 | 9/2007 |

OTHER PUBLICATIONS

International Search Report of PCT/EP2008/007823, dated Jan. 21, 2010.

* cited by examiner

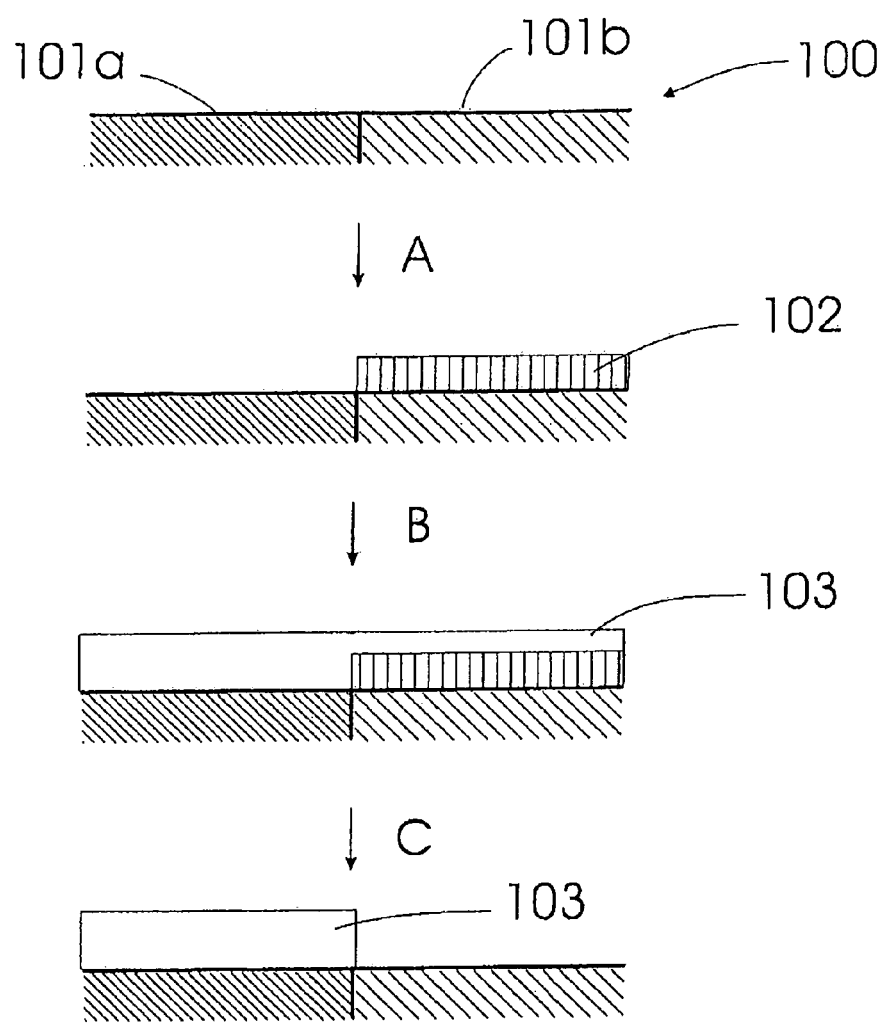

METHOD FOR PARTIALLY COATING COMPLEX COMPONENTS WITH CATALYTICALLY ACTIVE COMPONENTS

CROSS REFERENCE TO RELATED APPLICATIONS

This is a National Phase application of PCT application number PCT/EP2008/007823, filed Sep. 18, 2008, which claims priority benefit of German application number DE 10 2007 044 585.9, filed Sep. 19, 2007, the content of such applications being incorporated herein by reference.

FIELD OF THE INVENTION

The invention relates to a method for partially coating a shaped body, the surface of which comprises an area to be coated and an area to be left clear, wherein the area to be left clear is first provided with a protective layer which consists of a material that is removed residue-free by pyrolysis.

BACKGROUND OF THE INVENTION

When coating components, it is often desirable or necessary to carry out only a partial coating of components and, in subsequent steps, optionally to provide the areas to be left clear in the respective coating process with other coating materials or to leave these areas to be left clear completely uncoated. Thus it is desirable for example to keep areas which are imprinted or are to be imprinted, for example with a barcode, free of coating. It may also be necessary to leave uncoated areas around passage openings for example for measuring probes or areas around blind holes to which screw connections are to be attached. The areas to be left clear can also be provided for attaching electrical contacts or for other purposes.

Methods by which partial coatings can be carried out are known from the state of the art. Thus DE-A-43 34 131 describes a method in which ferromagnetic objects are partially coated by first providing the areas to be left clear with a permanent-magnetic film and then coating the ferromagnetic objects. Because of the magnetic forces, the films are attracted to the surface of the ferromagnetic object, closely covering it. The film can be removed after the coating and the area to be left clear remains untreated. However, a disadvantage is that the method can be used only with ferromagnetic materials. Furthermore, it takes time to remove the film again after the coating.

A method for coating elements with a plurality of openings is known from DE-A-29 40 582, in which shaped parts are inserted into the openings of the element to be coated, wherein the coating agent is applied to the element in a thickness which is less than the projecting height of the shaped parts. The shaped parts have a conical, pyramidal or gable roof-like shape, wherein in each case the inclination angle of the shaped surface abutting the associated opening of the element is larger than that of the element surface bordering the openings. The shaped surface abuts the top edge of the opening, sealing it in a linear manner. A disadvantage with this method is that a covering of further surrounding areas around the opening is not possible. Furthermore, a sufficiently secure arrangement of the shaped parts in the openings is not guaranteed.

It is known from U.S. Pat. No. 5,328,723 to use plug-like covering means which have a conical section, with a round cross-section, which can be inserted into the recess and consist of a thermoplastic foam. A sufficiently reliable covering of the areas to be left clear is not guaranteed by means of this covering, in particular in the case of automated coating processes. Furthermore, the two last-mentioned methods of the state of the art have the disadvantage that the partial coating of smooth surfaces not provided with recesses or holes is very time-consuming or not possible.

A method which makes possible the partial coating of smooth surfaces which are not provided with recesses or holes is disclosed in DE-A-10 149 892. In this method, metal surfaces to be treated are partially protected by first covering the area of the metal surface, which is to be left clear and not treated, with a fluid acting as protective layer. This is transformed from a liquid aggregate state into a solid aggregate state by exposure to light and/or radiation or by heat extraction. The surface treatment then takes place and the protective layer is then removed again. This method has been developed for the partial electroplating of surfaces.

Catalytically active layers cannot be partially applied to shaped bodies with this method. The protective layer which cures through heat extraction, thus is liquid at higher temperatures, mixes in the liquid state with the applied washcoat suspension. Furthermore, the protective layer cannot be removed by dissolving it with a solvent if it is covered with a washcoat layer. Shaped bodies cannot be partially provided with a washcoat coating using this method.

DE 101 49 892 A1 describes a method for partially applying a coating to a metal surface by means of a surface treatment, in particular an electroplating treatment, in order to obtain areas with a coating and areas without a coating. The parts of the metal surface not to be coated are first covered with a fluid acting as protective layer which is transformed from a liquid aggregate state into a solid aggregate state by exposure to light and/or radiation or heat extraction, a surface treatment follows and then the protective layer is removed again.

DE 10 2004 058 705 B3 discloses a disposable masking method for a thermal coating method as well as a corresponding thermal coating method, wherein the disposable masking is constructed from moistened particles compressed together in a female mould.

EP 1 510 592 A1 also describes a partial method for coating a component, wherein a masking is applied which consists at least in part of a ceramic powder and can be removed after the coating of the component. This document does not disclose thermal removal.

DESCRIPTION OF THE INVENTION

The object of the invention is to find a method with which smooth or rough surfaces can be partially coated quickly and optionally in automated manner. In particular shaped bodies are to be coated with a washcoat suspension.

This object is achieved according to the invention by a method for partially coating a shaped body, the surface of which comprises an area to be coated and an area to be left clear, characterized in that, with the method, a protective layer is applied to the area to be left clear, a coating is applied to the surface, wherein the coating consists of a washcoat suspension and the coated shaped body is heated to a temperature at which the protective layer is pyrolytically removed residue-free.

The coating is the coating with which the shaped body is to be coated at the desired locations. In a preferred method, this coating can be a curable coating which can cure at room temperature or at a higher temperature. A coating which cures through the action of light is also conceivable. In the case of the washcoat suspension, the layer cures for example at 550° C. Washcoat suspensions are usually calcined at this temperature.

By the method according to the invention, shaped bodies can be partially coated by a few steps involving little effort. The washcoat is to adhere to the area to be coated of the surface of the shaped body, while the area to be left clear is to remain free of the washcoat coating after the method has been carried out. By first applying the protective layer to the area to be left clear, the washcoat suspension then applied has no direct contact with the surface of the shaped body. As the temperature then rises, the material of which the protective layer consists is pyrolysed, with the result that the washcoat coating delaminates. "Pyrolytically removed" means, in this connection, that the protective layer is removed or burnt off by pyrolysis. During a pyrolysis, chemical compounds are thermally split, wherein a bond fracture inside large molecules is forced by high temperatures. Within the framework of this invention, it is always to be understood as meaning that this can occur both as a result of oxidation or partial oxidation, i.e. in an oxygen or air atmosphere, and without a supply of oxygen. The protective layer is burnt off residue-free by the pyrolysis.

The method is particularly suitable in the production of coating catalysts. Usually, these are produced by coating a catalyst support body with porous catalytically active metal oxides with a high surface area, wherein these metal oxides are applied to the catalyst support body by means of a so-called washcoat suspension, i.e. a slurry of the metal oxides in a fluid medium. Usually, the applied washcoat suspension is then dried, thereafter optionally impregnated with an active component and then activated by calcining. Because of the ceramic powder contained in the washcoat suspension, the thus-produced coating has a high surface area on which catalytically active noble metals are found.

According to a preferred embodiment of the invention, the protective layer is applied to the area to be left clear by spraying, brushing, dipping or rolling. In practice, the material which forms the protective layer can be slurried or dissolved in a solvent and then applied to the area to be left clear. If necessary, the protective layer must dry or cure. These method steps are the steps involving the least effort for applying a protective layer.

According to a further preferred embodiment, the material which forms the protective layer can comprise a lacquer, a resin, an adhesive, in particular an adhesive customary in the trade, or a polymer. Preferably, the material comprises one or more of the following: polyethylene glycol, polypropylene glycol, polyacrylate, poly(meth)acrylate, polybutyrate, polyvinyl acetate, polyvinyl alcohol, polyolefin, polyurethane, polyethylene vinyl acetate, or a resin, such as for example acrylic resin lacquer, epoxide resin, melamine-formaldehyde resin or phenol-formaldehyde resin. It is to be understood within the framework of this invention that the polymers can be used in the form of homopolymers and also in the form of copolymers of any of the above-named polymers as materials which are suitable for the protective layer. Decisive in the choice of the material making up the protective layer is that, when applying the washcoat suspension or during a subsequent method step, the material does not mix with the washcoat suspension, and that the material can be pyrolysed residue-free. This is particularly the case with polymers containing oxygen. Polymers containing oxygen are therefore quite particularly preferred as material for the protective layer.

According to a preferred embodiment of the method according to the invention, the protective layer is dried, after the application, in air at room temperature or at a higher temperature of up to 120° C. for between ten seconds and three hours, more preferably between five minutes and 60 minutes and still more preferably between five and 10 minutes. Depending on the choice of the material forming the protective layer, it may be necessary to dry the protective layer. If, for example, the protective layer is a lacquer or an adhesive, it may be necessary that the material cures. If the material forming the protective layer is a polymer, this can first be dissolved in a solvent before it is applied to the corresponding locations, for example by spraying, wherein it may be necessary to allow the solvent to evaporate after the application.

According to a preferred method according to the invention for partially coating a shaped body with a surface which comprises an area to be coated and an area to be left clear, a protective layer is first applied to the area to be left clear and dried, a washcoat suspension is applied to the surface, then the washcoat suspension is dried and calcined, and the coated shaped body heated to a temperature at which the protective layer is removed residue-free by pyrolysis.

According to a particularly preferred embodiment, the washcoat suspension is dried at a temperature of between 80 and 120° C. The washcoat suspension is then calcined at a temperature of between 200 and 600° C., more preferably between 400 and 500° C. It is particularly preferable to carry out the calcining and the pyrolysis at the same temperature. Calcining of the washcoat suspension and pyrolysis of the protective layer are thus carried out in one method step. Unlike known methods for partially coating shaped bodies, in this preferred embodiment of the invention the coated area of the surface and the area left clear of the surface are obtained in one method step. Protective elements, such as for example films, do not need to be removed after a coating. This advantage is achieved in that the completion of the coating, i.e. the calcining, and the "production" of the area to be left clear on the surface are achieved by a single heating to one temperature.

Nevertheless, the complete removal of residues of the washcoat from the areas to be left clear can be speeded up by further method steps. In a preferred embodiment of the method according to the invention, the shaped body is shaken after the heating. Remaining residues of the washcoat coating are thereby delaminated from the areas to be left clear. Within the framework of this invention, by shaking is also meant a single jolt of the coated shaped body.

Alternatively, in a preferred method, the area to be left clear of the surface can be swept with a brush or exposed to a jet of compressed air after the pyrolysis. Small residues or dust are thereby removed from the area to be left clear.

Quite particularly preferably, the method is suitable for keeping areas of a shaped body which are provided with imprints, in particular with a barcode, free of washcoat coatings. For example, imprinted areas of shaped bodies to be coated can also be provided, as a precaution, with a protective layer which is then pyrolysed. Cleaning steps involving greater effort are thereby avoided.

This method is particularly advantageously used for coating metal or ceramic catalyst support bodies or heat exchangers. The method according to the invention is thus particularly preferred for partially coating shaped bodies which represent a foam structure, a honeycomb body or a micro heat exchanger.

The method is particularly advantageous for these shaped bodies, as the shaped bodies have structured surfaces which are heterogeneous and therefore can be masked only with difficulty or not at all by the methods described in the state of the art, in particular in DE-A-43 34 131, in order to then apply the coating only to the desired locations of the shaped body.

The teaching according to the invention is explained in more detail below with reference to a figure and an example. These are not to be understood as limiting for all methods according to the invention.

BRIEF DESCRIPTION OF THE FIGURES

FIG. 1 is a schematic representation of the method according to the invention comprising the steps A to C.

FIG. 1 shows, at the top, a shaped body (100) the surface of which consists of an area to be coated (101a) and an area to be left clear (101b). In method step A, a protective layer (102) is applied to the area to be left clear (101b). Then, in method step B, the layer comprising a washcoat suspension (103) is applied to the whole surface of the shaped body (100). Then, in a method step C, the coated shaped body is heated, with the result that the material of which the protective layer (102) consists is pyrolysed. The contact between constituents of the washcoat suspension and the surface of the shaped body (100) in the area to be left clear (101b) is thus lost, with the result that the layers in the area delaminate and only the area to be coated (101a) remains coated.

EXAMPLE

A metal surface which is heated for three hours to 1000° C. is divided into five parts which are numbered from 1 to 5. Part 1 remains untreated, thus does not receive a protective layer. Part 2 is coated with Plastik 70 spray (CRC Industries Deutschland GmbH, Iffezheim). This is an acrylic resin lacquer which remains untreated. Part 3 is provided with a polybutyrate protective layer, part 4 is provided with a layer of UHU glue, and a layer of Vinapas is applied to part 5. This is the product EP 65 W (Wacker-Chemie), a composition which essentially contains polyvinyl acetate. All of the parts are then dried for two hours at 80° C. and dipped into a washcoat suspension (production: see example 3 of U.S. Pat. No. 4,900, 712) which is then dried again for two hours at 80° C. The coated metal sheet is then heated for three hours to a temperature of 550° C. After the calcining, the coated metal sheet is tapped on the table once. The density of the coating on the surface is then checked. While the untreated surface (part 1) remains almost completely (90 to 100% of the surface) coated with a washcoat layer, the remaining parts (parts 2 to 5) are freed of a washcoat layer. In the case of the polybutyrate protective layer (part 3), a residual coating material adheres at first, which is completely removed by a single sweep of the metal sheet with a brush.

The invention claimed is:

1. A method for partially coating a shaped body, the surface of which comprises an area to be coated and an area to be left clear, comprising the steps of:
    a) selectively applying a protective layer to the area to be left clear;
    b) applying a coating to the surface, wherein the coating comprises a washcoat suspension; and
    c) heating the coated shaped body to a temperature at which the protective layer is pyrolytically removed residue-free and the coating on the protective layer is delaminated,
    wherein the shaped body is a metal or ceramic catalyst body or heat exchanger.

2. The method of claim 1, wherein the coating is a curable coating.

3. The method of claim 1, wherein the protective layer is applied to the area to be left clear by spraying, brushing, dipping or rolling.

4. The method of claim 1, wherein the protective layer comprises a lacquer, a resin, an adhesive, or a polymer.

5. The method of claim 4, wherein the polymer comprises polyethylene glycol, polypropylene glycol, polyacrylate, poly(meth)acrylate, polybutyrate, polyvinyl acetate, polyvinyl alcohol, polyolefin, polyurethane or polyethylene vinyl acetate.

6. The method of claim 4, wherein the resin comprises phenol-formaldehyde resin, epoxide resin, melamine-formaldehyde resin or acrylic resin lacquer.

7. The method of claim 1, wherein the protective layer is dried after application for ten seconds to three hours.

8. The method of claim 7, wherein the protective layer is dried after application for five minutes to 60 minutes.

9. The method of claim 8, wherein the protective layer is dried after application for five minutes to ten minutes.

10. The method of claim 1, wherein the washcoat suspension is dried and calcined after the application.

11. The method of claim 10, wherein the washcoat suspension is dried at a temperature of between 80 and 120° C.

12. The method of claim 11, wherein the washcoat suspension is calcined at temperatures of 200 to 600° C.

13. The method of claim 10, wherein the washcoat suspension is calcined at temperatures of 200 to 600° C.

14. The method of claim 1, wherein the shaped body is shaken after the pyrolysis.

15. The method of claim 1, wherein the area of the surface to which the protective layer has been applied is swept with a brush or exposed to a jet of compressed air after the pyrolysis.

16. The method of claim 1, wherein the area to be left clear is provided with an imprint or with a barcode.

17. The method of claim 1, wherein the shaped body represents a foam structure, a honeycomb body or a micro heat exchanger.

18. The method of claim 1 wherein
    the shaped body is a metal or ceramic catalyst body or heat exchanger, and wherein the protective layer is applied to the area of the surface to be left clear by spraying, brushing, dipping, or rolling.

19. The method of claim 18, wherein the coating is a curable coating.

20. The method of claim 18, wherein the protective layer comprises a lacquer, a resin, an adhesive, or a polymer.

21. The method of claim 20, wherein the polymer comprises polyethylene glycol, polypropylene glycol, polyacrylate, poly(meth)acrylate, polybutyrate, polyvinyl acetate, polyvinyl alcohol, polyolefin, polyurethane or polyethylene vinyl acetate.

22. The method of claim 20, wherein the resin comprises phenol-formaldehyde resin, epoxide resin, melamine-formaldehyde resin or acrylic resin lacquer.

23. The method of claim 18, wherein the protective layer is dried after application for ten seconds to three hours.

24. The method of claim 23, wherein the protective layer is dried after application for five minutes to 60 minutes.

25. The method of claim 24, wherein the protective layer is dried after application for five minutes to ten minutes.

26. The method of claim 18, wherein the washcoat suspension is dried and calcined after the application.

27. The method of claim 26, wherein the washcoat suspension is dried at a temperature of between 80 and 120° C.

28. The method of claim 26, wherein the washcoat suspension is calcined at temperatures of 200 to 600° C.

29. The method of claim 18, wherein the shaped body is shaken after the pyrolysis.

30. The method of claim 18, wherein the area of the surface to which the protective layer has been applied is swept with a brush or exposed to a jet of compressed air after the pyrolysis.

31. The method of claim 18, wherein the area to be left clear is provided with an imprint or with a barcode.

32. The method of claim 18, wherein the shaped body represents a foam structure, a honeycomb body or a micro heat exchanger.

* * * * *

UNITED STATES PATENT AND TRADEMARK OFFICE
CERTIFICATE OF CORRECTION

PATENT NO. : 8,679,584 B2
APPLICATION NO. : 12/678842
DATED : March 25, 2014
INVENTOR(S) : Anfang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this

Twenty-ninth Day of September, 2015

Michelle K. Lee
*Director of the United States Patent and Trademark Office*